United States Patent [19]
Burnett

[11] 3,885,210
[45] May 20, 1975

[54] DRIVE CIRCUITS FOR STEPPING MOTORS

[75] Inventor: Alan Burnett, Coventry, England

[73] Assignee: Wickman Machine Tool Sales Limited, Coventry, Warwickshire, England

[22] Filed: Nov. 21, 1973

[21] Appl. No.: 418,064

[30] Foreign Application Priority Data
Dec. 6, 1972 United Kingdom............... 56204/72

[52] U.S. Cl................................. 318/696; 318/138
[51] Int. Cl............................................. H02k 37/00
[58] Field of Search..................... 318/696, 685, 138

[56] References Cited
UNITED STATES PATENTS

| | | | |
|---|---|---|---|
| 3,445,741 | 5/1969 | Gerber............................. | 318/696 |
| 3,577,176 | 5/1971 | Kreithen.......................... | 318/685 |
| 3,662,245 | 5/1972 | Newell............................. | 318/685 |
| 3,757,193 | 9/1974 | Shimizu (Inaba)............... | 318/696 |
| 3,767,993 | 10/1973 | Yublonski....................... | 318/685 |
| 3,787,727 | 1/1974 | Mesparran...................... | 318/685 |

Primary Examiner—G. R. Simmons

[57] ABSTRACT

In a stepping motor having a plurality of windings which are energised in sequence to effect the required stepping movement of the motor, the drive circuit for the motor varies the current flowing in each winding in incremental steps between zero and a maximum value. Ideally the incremental steps are unequal but are arranged to produce equal incremental steps of the motor.

4 Claims, 4 Drawing Figures

DRIVE CIRCUITS FOR STEPPING MOTORS

This invention relates to drive circuits for stepping motors of the kind incorporating a plurality of windings which are energised in sequence to effect the required stepping movement of the motor.

The invention resides in a drive circuit for a stepping motor of the kind specified in which, in use, the drive circuit varies the current flowing in each winding in incremental steps between zero and a maximum value.

Preferably, the incremental steps are unequal but are arranged to produce equal incremental steps of the motor.

In another aspect, the invention resides in a stepping motor having a drive circuit as specified above, including a first voltage supply for energising the windings under the control of the drive circuit, a second and higher voltage supply, and switch means operable when the required stepping rate exceeds a predetermined value for coupling the windings to the second voltage supply.

The invention further resides in a stepping motor having a drive circuit as specified above, and in which in order to maintain a required current in a winding at any given moment, a transistor in series with the winding is switched on and off to establish in the winding a mean current flow equal to said required current.

In the accompanying drawings.

Figure 1:
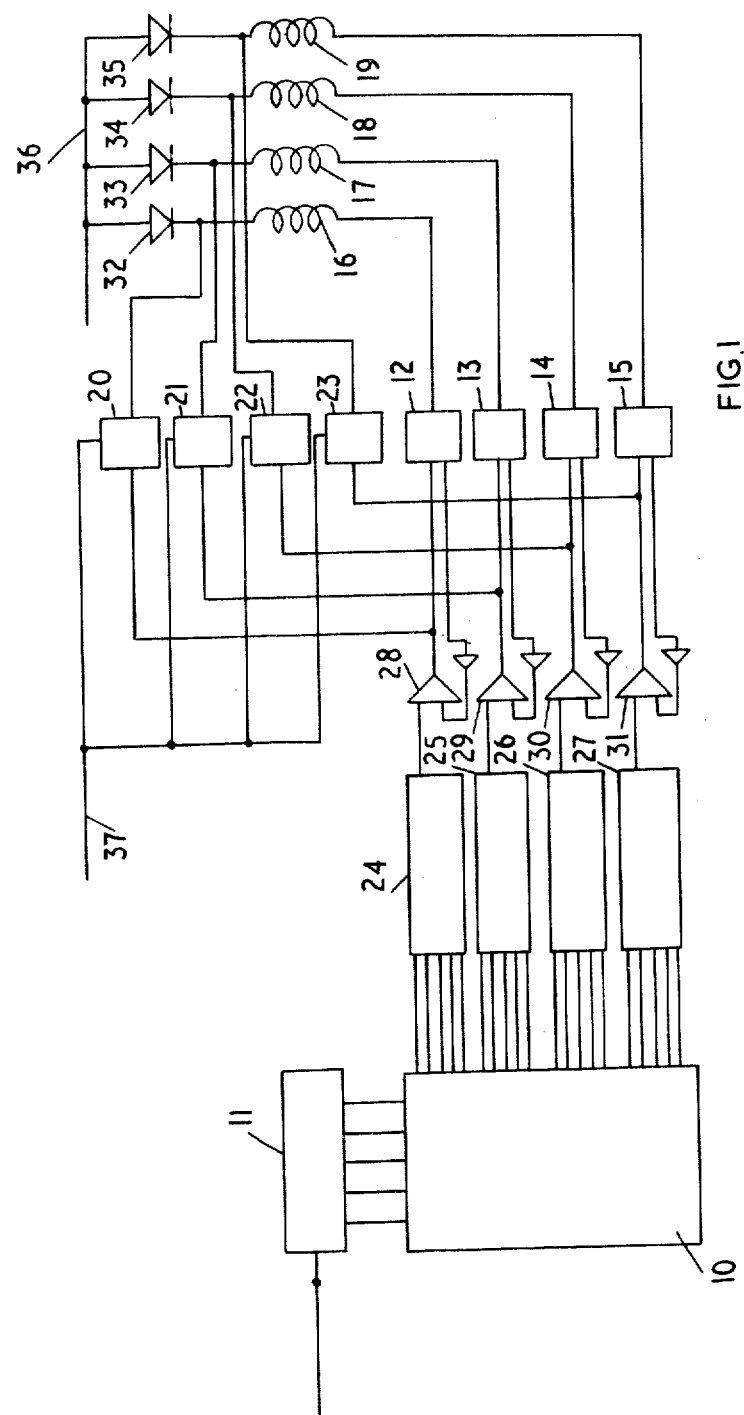
FIG. 1 is a block diagram illustrating one example of the invention.

Referring first to FIG. 1, a stepping motor includes four windings 16, 17, 18, 19 which are to be energised in sequence to effect the required stepping movement of the motor. The windings 16, 17, 18, 19 each have one end connected through respective diodes 32, 33, 34, 35 to a supply rail 36, and their other ends connected respectively to current controllers 12, 13, 14 and 15. The junctions of the windings 16 to 19 and their respective diodes 32 to 35 are coupled through switches 20 to 23 respectively, to a supply rail 37.

Both the switches 20-23 and the current controllers 12 to 15 are controlled in a manner to be described by the outputs from four operational amplifiers 28 to 31. The non-inverting inputs of the amplifiers 28 to 31, are fed by four digital to analogue converters 24 to 27 respectively, whilst the inverting inputs of the amplifiers 28 to 31 receive a feedback signal from the current controllers 12 to 15. The converters 24 to 27 are fed by a decoder 10, which in turn is fed by a counter 11 receiving input pulses at a frequency dependent upon the required stepping rate. The input pulse to the counter 11 may be derived from a conventional rate multiplier in a manner which is not important to an understanding of the present invention.

Figure 2:
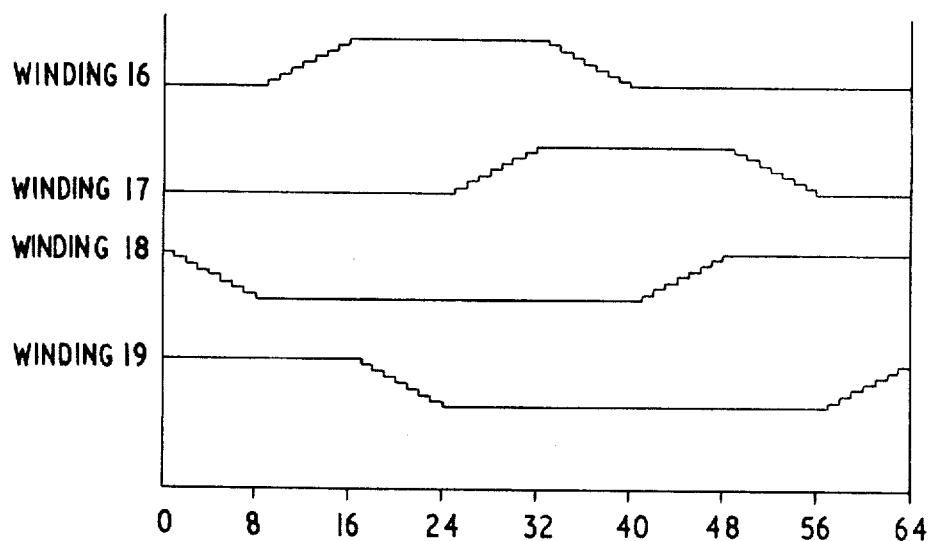
FIG. 2 illustrates the waveforms in FIG. 1.

In order to understand the operation of the system, reference is directed to FIG. 2 which shows the voltage waveforms at the outputs of the four converters 24–27. The cycle shown in FIG. 2 represents one-fiftieth of a revolution of the motor, and at the beginning of this cycle it will be seen that the windings 18 and 19 are fully energised, and the windings 16 and 17 are not energised at all. When the next pulse is received at the counter 11, the decoder 10 retains exactly the same inputs to the converters 24, 25 and 27, so that the currents flowing in the windings 16, 17 and 19 are not altered. However, the output from the converter 26 is decreased as indicated by the downward step in FIG. 2. The amplifier 30 operates to produce in the winding 18 a current such that the inputs of the two terminals of the amplifier 30 are equal. Since the voltage at the non-inverting terminal of the amplifier 30 is now reduced, the controller 14 will operate to reduce the current flowing in the winding 18, this current being derived from the line 36 by way of the diode 34. Further pulses into the counter 11 continue to reduce the current flowing in the winding 18 incrementally until after the receipt of the eighth pulse, there is no current flowing in the winding 18. The ninth pulse than modifies the voltage at the non-inverting terminal of the amplifier 28, and current commences to flow in the winding 16. The further sequence of operations will be clear from a consideration of FIG. 2.

An important feature of the arrangement described is that it has been discovered that equal incremental voltage changes at the outputs of the converters 24 to 27 do not give rise to equal incremental movements of the motor. In other words, if a predetermined voltage change is required to move the motor from a first position to a second position, then it may be that to move the motor from the second position to a third position, either a greater or a smaller incremental voltage change is needed. The arrangement shown overcomes this problem by arranging that the voltage increments are matched to the motor, so that equal motor increments are obtained. This can be accomplished quite simply by providing from the decoder 10 to the converters 24-27 five input lines as shown in FIG. 1. Since there are five input lines, then clearly there are 32 possible numbers that can be fed from the decoder to the converters 24–27. However, since in the arrangement described only eight steps are required in the outputs of each converter, it will be seen that this gives scope to arrange the voltage increments so that they are unequal, and give the required equal motor increments.

In the description above, no mention has been made of the switches 20 to 23. Provided that the required stepping rate is below a predetermined level, then when one of the amplifiers 28 to 31 demands a greater current in its respective winding 16 to 19, the current will increase in the appropriate winding at such a rate that the input to the amplifier 28, 29, 30 or 31 remains substantially equal, and the output voltage of the amplifier does not rise to a sufficient value to turn on one of the switches 20 to 23, which are voltage-sensitive. However, if the stepping rate is sufficiently high, then by virtue of their inductance, the windings 16 to 19 oppose the increase in current to an extent such that the output voltage of the appropriate amplifier 28 to 31 rises to a value sufficient to turn on the respective switch 20 to 23. If this happens, then the winding in question is coupled to the supply rail 37 through one of the switches 20 to 23, and the appropriate diode 32 to 35 is reverse biased. Because the supply rail 37 is of a substantially higher voltage than the rail 36, current flow in the windings 16 to 19 can increase more rapidly, so increasing the stepping rate.

Figure 3:
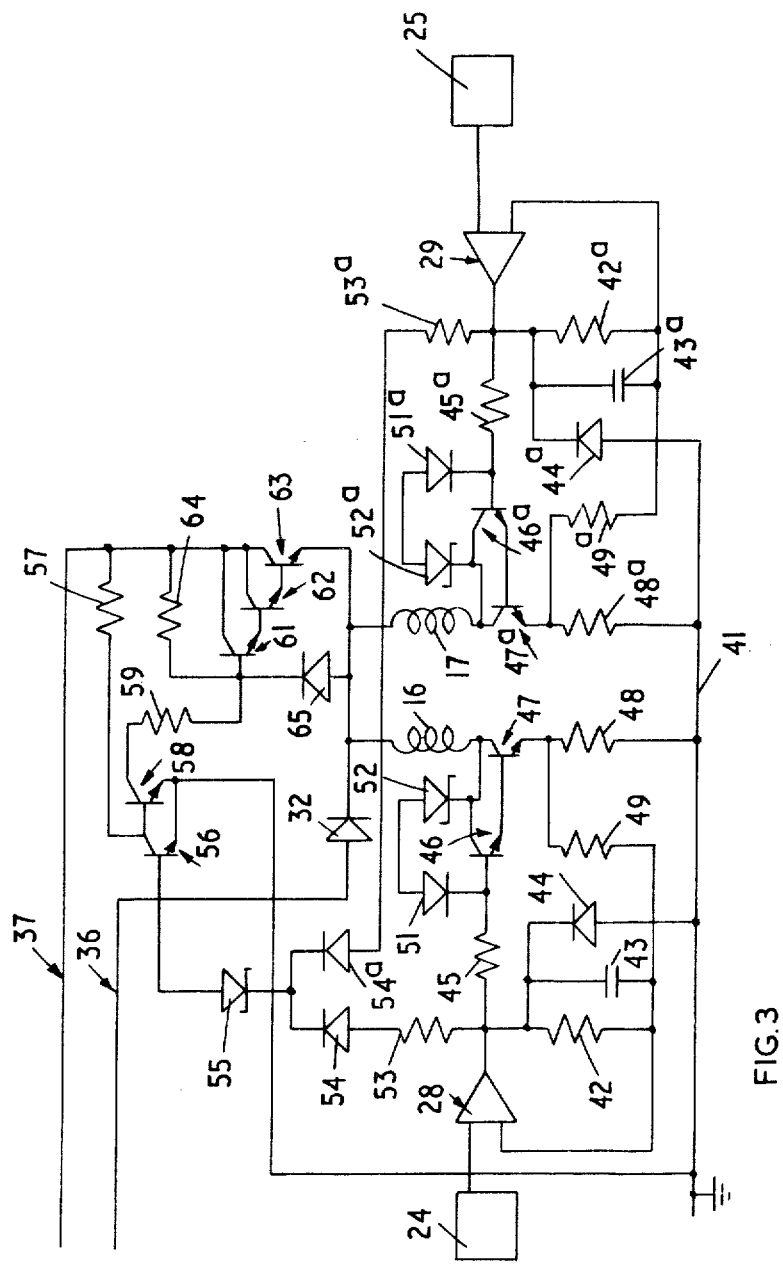
FIG. 3 illustrates details of the circuit shown in FIG. 1.

The details of the current controllers 12 to 15 and the switches 20 to 23 can of course vary widely, but one arrangement is shown in FIG. 3. In FIG. 3, the amplifiers 28 and 29 are shown, and the arrangement illustrated is repeated for the amplifiers 30 and 31. Also, in FIG. 3 the windings 16 and 17 have one end thereof interconnected, which permits the switches 20 and 21 to be combined. However, the arrangement can obviously be modified to cope for a situation in which the windings 16 and 17 are totally separate.

Referring to FIG. 3, the drawing shows the amplifiers 28, 29 and their associated converters 24 and 25 and windings 16, 17. The lines 36, 37 are also shown, together with an earth supply line 41. It will be noted that the windings 16 and 17 are both connected to the line 36 through the diode 32. The diode 33 is not required because the windings 16, 17 have one end interconnected.

The output terminal of the amplifier 28 is connected to its inverting input through a resistor 42 and a capacitor 43 in parallel, and is further connected through a diode 44 to the line 41. Additionally, the output terminal of the amplifier 28 is connected through a resistor 45 to the base of an n-p-n transistor 46 having its emitter connected to the base of an n-p-n transistor 47, the collector of which is connected to the winding 16 and the emitter of which is connected to the line 41 through a resistor 48. The required feedback to the amplifier 28 is taken from the emitter of the transistor 47 by way of a resistor 49. Moreover, the base of the transistor 46 is connected to the collector of the transistor 47 through a diode 51 and a Zener diode 52 in series.

The components associated with the amplifier 29 are the same as those associated with the amplifier 28, and are indicated by the same reference numeral with the suffix a.

The output terminal of the amplifier 28 is connected through a resistor 53 to the anode of a diode 54. Similarly, the amplifier 29 has its output terminal connected through a resistor 53a to the anode of a diode 54a. The diodes 54 and 54a provide the input to the combined switch 20, 21, this switch including a Zener diode 55 coupling the cathodes of the diodes 54, 54a to the base of an n-p-n transistor 56 having its collector connected through a resistor 57 to the line 37, and also connected to the base of an n-p-n transistor 58, the emitters of the transistors 56, 58 being connected to the line 41. The transistor 58 has its collector connected through a resistor 59 to the base of an n-p-n transistor 61, which is connected in cascade with two further n-p-n transistors 62, 63, the emitter of the transistor 63 being connected to the upper ends of the windings 16, 17, and the collectors of the transistors 61, 62, 63 being connected to the line 37. Moreover, the base of the transistor 61 is connected through a resistor 64 to the collectors of the transistors 61, 62, 63, and is also connected through a diode 65 to the upper ends of the windings 16, 17.

As long as the frequency with which the stepping motor is to be operated is below a predetermined value, then the output voltage of the amplifier 28 never rises sufficiently to turn on the Zener diode 55, and so the transistor 56 is off and the transistor 58 is held on by current flowing through the resistor 57. Because transistor 58 is conducting, current flowing through the resistor 64 is diverted by way of the resistor 59 and the transistors 61 to 63 are off, so that the windings 16 and 17 are decoupled from the line 37 and are connected to the line 36 through the diode 32. The amplifier 28 compares the signals at its two input terminals as previously explained, and varies the conduction of the transistors 46 and 47 to give the required current flow in the winding 16. The amplifier 29 behaves in the same way to vary the current flow in the winding 17. The various diodes and capacitor employed in the circuit operate in the conventional manner to give the required characteristics and stability in the system.

If the selected frequency exceeds a predetermined value such that the output of the amplifier 28 or the amplifier 29 rises and the Zener diode 55 breaks down, then the transistor 56 is turned on, turning off the transistor 58 and allowing current flowing through the resistor 64 to turn on the transistors 61, 62 and 63. The amplifiers operate in exactly the same way, but the windings 16 and 17 are now coupled to the line 37, as described previously.

Figure 4:
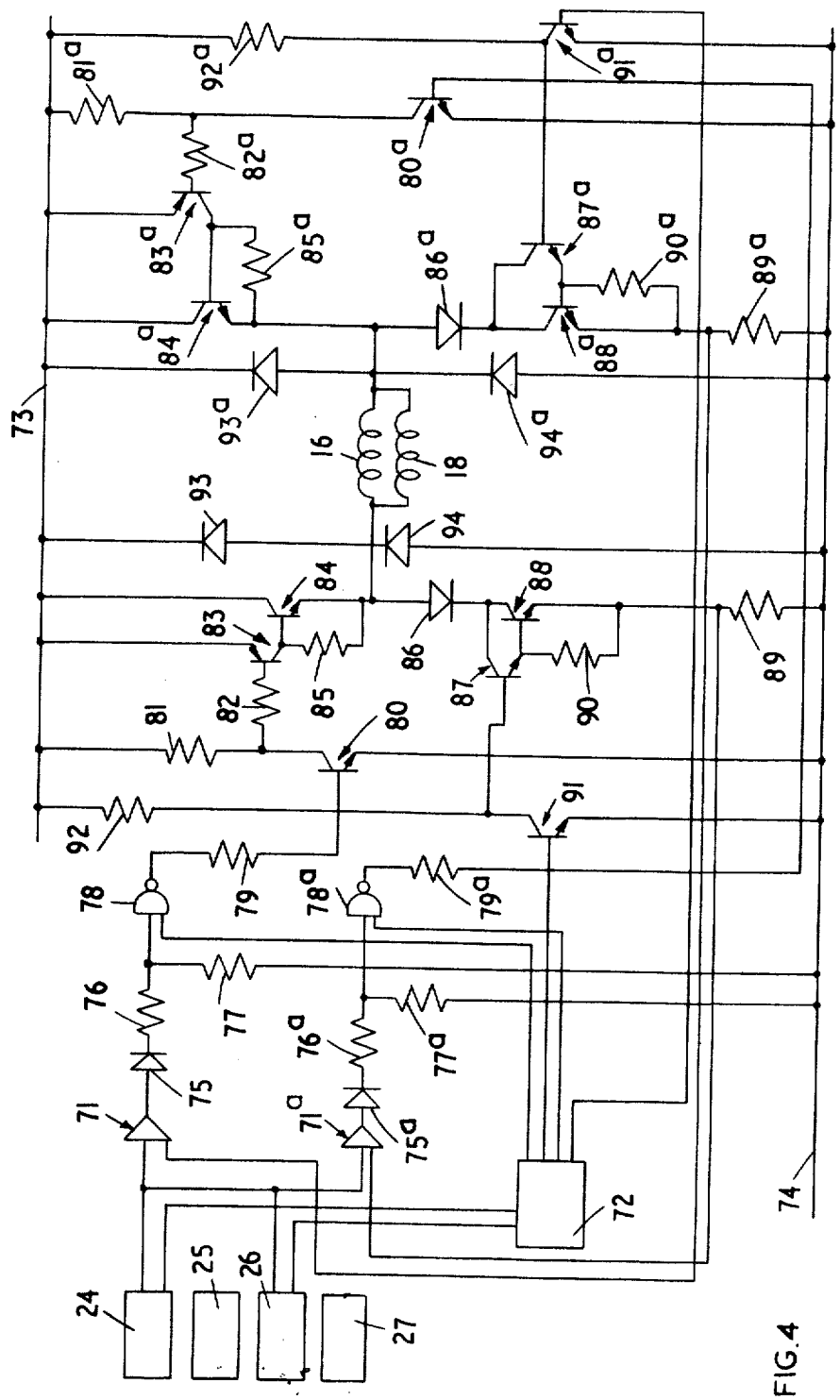
FIG. 4 is a circuit diagram illustrating a second example.

Referring now to the arrangement shown in FIG. 4, the converters 24 to 28 are controlled in exactly the same way as in FIG. 1, and the arrangement shown in FIG. 4 controls the equivalent of the windings 16 and 18 in FIG. 1. The waveforms of FIG. 2 apply equally to FIG. 4, and the arrangement shown in FIG. 4 is duplicated for controlling the winding 17 and 19. In FIG. 4, the outputs from the converters 24 and 26 are applied to the non-inverting inputs of a pair of operational amplifiers 71, 71a, and are also applied to a logic network 72. The circuit includes positive and negative supply lines 73, 74, and the output terminal of the amplifier 71 is connected to the line 74 through a diode 75 and resistors 76, 77 in series, the junction of the resistors 76, 77 being connected to a Schmitt trigger circuit 78 which also receives an input from the logic network 72. The output terminal of the trigger circuit 78 is connected through a resistor 79 to the base of an n-p-n transistor 80, the collector of which is connected through a resistor 81 to the line 73 and the emitter of which is connected to the line 74. The collector of the transistor 80 is further connected through a resistor 82 to the base of a p-n-p transistor 83 having its emitter connected to the line 73 and its collector connected to the base of an n-p-n transistor 84. The transistor 84 has its collector connected to the line 73, its emitter connected through resistor 85 to the collector of the transistor 83, and its emitter further connected through a diode 86 to the collectors of a pair of n-p-n transistor 87, 88, the emitter of the transistor 88 being connected through a resistor 89 to the line 74, the emitter of the transistor 87 being connected to the base of the transistor 88 and being further connected through a resistor 90 to the emitter of the transistor 88, and the base of the transistor 87 being connected to the collector of an n-p-n transistor 91 having its emitter connected to the line 74, its collector connected through a resistor 92 to the line 73 and its base connected to the logic network 72. The emitter of the transistor 84 is further connected to the line 73, 74 respectively through diodes 93, 94. The emitter of the transistor 88 is connected to the inverting input terminal of the amplifier 71a.

An exactly similar set of components is associated with the output terminal of the amplifier 71a, and these components are indicated by the same reference numerals but with the suffix a. Finally, the windings 16 and 18 are connected in parallel between the emitters of the transistors 84, 84a.

The type of motor with which the arrangement of FIG. 4 is used is different from the type of motor used in FIG. 3. In FIG. 3, the motor is a six-lead motor, that is to say there are six available leads for making connections to the windings. In FIG. 4, the windings each have both ends available for connections to be made, that is to say the motor is an eight-lead motor. In such an arrangement, the winding 16 and 18 can be energised simultaneously, and in FIG. 4 the flow of current between the lines 73 and 74 from right to left through the windings 16, 18 is equivalent to the winding 16 being energised in FIG. 3, whilst a flow of current from left to right through the windings 16 and 18 is equivalent to the winding 18 being energised in FIG. 3. It will be noted from FIG. 2 that the windings 16 and 18 can be combined in this way because whenever there is current flow in the winding 16 of FIG. 3, there is no current flow in the winding 18 of FIG. 3, and vice versa.

In order to understand the operation, consider a situation where the winding 16 indicated in FIG. 2 is about to be energised, that is to say both windings 16, 18 in FIG. 4 must be energised with current flowing from right to left. At the moment when there is a stepped increase in the input to the amplifier 71 and 71a, as shown in FIG. 2, the logic network 72 inhibits the trigger circuit 78, so that the transistor 80 is off and the transistors 83 and 84 cannot conduct. The logic network also turns the transistor 91 off so that the transistors 87 and 88 can conduct, and turns the transistor 91a on so that the transistors 88a and 87a cannot conduct. The voltage at the non-inverting input terminal of the amplifier 71a is greater than the voltage at the inverting input terminal of the amplifier 71a because there is no current flowing in the resistor 89, and so the output from the amplifier 71a switches the trigger circuit 78a which turns on the transistor 80a, which in turn turns on the transistors 83a and 84a. Current now flows from right to left through the windings 16, 18 as required. The current flowing in the resistor 89 now rises until a point is reached at which the amplifier output 71a becomes such that the trigger circuit 78a reverts to its original state, turning off the transistor 80a so that the transistors 84a and 83a turn off. This chopping action contues to maintain a mean current level in the windings 16, 18 equal to the demanded current at the non-inverting input terminal of the amplifier 71a. As the signal at the non-inverting input terminal of the amplifier 71a increases in stepped fashion as shown in FIG. 2, then the current in the windings 16, 18 will increase in similar manner. The arrangement differs markedly from that shown in FIG. 3 in that the transistors controlling the windings 16, 18 are all either on or off, as distinct from being in an amplifying mode as in FIG. 3. This enables a higher voltage supply to be used between the lines 73, 74, and for this reason the two-voltage supply used in FIG. 3 is not necessary.

The arrangement when the equivalent of the winding 18 in FIG. 3 is to be energised is similar. In FIG. 4, this is represented by current flowing from left to right through the windings 16, 18, and in such circumstances it can readily be seen that the logic network holds the transistors 87, 88, 83a, 84a off and the transistors 87a, 88a on. The amplifier 71 then controls conduction of the transistors 83 and 84 in the chopping mode described above with reference to the transistors 83a, 84a.

The diodes 94, 94a provide the required conduction path during the chopping operation. Thus, with current flowing from right to left then when the transistors 83a, 84a are turned off by the amplifier 71a, current flow is maintained through the transistors 87, 88 and the diode 94a. This current will of course decay until the amplifier 71a switches the transistors 83a and 84a on again. The diode 94 performs a similar function when current is flowing from left to right through the windings 16, 18. The diode 93 and 93a are provided to dissipate energy when the logic network turns off the transistors 87, 88 or the transistors 87a, 88a. This of course will happen when no further current flow in the windings 16, 18 is required.

Although the logic network 72 has not been described in detail, it will be obvious that this network can take a variety of forms, since it has only to perform simple switching functions in accordance with whichever of the converters 24, 26 is producing an output.

I claim:

1. A drive circuit and a stepping motor of the kind incorporating a plurality of windings which are energized in sequence to effect the required stepping movement of the motor, said drive circuit comprising means for selectively varying the current flowing in each winding in unequal incremental steps between zero and a maximum value, and means permitting selection of the magnitude of each incremental step independently of the other incremental steps, so as to enable the incremental steps to be set independently to match the non-linear characteristic of the motor to obtain equal incremental steps of the motor.

2. A drive circuit and a stepping motor as claimed in claim 1 comprising a first voltage supply for energizing the windings under the control of the drive circuit, a second and higher voltage supply, and switch means operable when the required stepping rate exceeds a predetermined value for coupling the windings to the second voltage supply.

3. A drive circuit and a stepping motor as claimed in claim 1 comprising means for switching on or off a transistor in series with the winding to establish in the winding a mean current flow equal to the required current.

4. A drive circuit and a stepping motor as claimed in claim 1 comprising an operational amplifier, means to feed to said amplifier a signal representing the required current in a winding, and means to direct a feedback signal representing the actual current flow in the winding to said operational amplifier, the output from said amplifier then controlling the current flow in the winding.

* * * * *